United States Patent [19]
Feng

[11] Patent Number: 5,592,227
[45] Date of Patent: Jan. 7, 1997

[54] METHOD AND APPARATUS FOR COMPRESSING A DIGITAL SIGNAL USING VECTOR QUANTIZATION

[75] Inventor: Yushu Feng, Elk Grove Village, Ill.

[73] Assignee: VCOM, Inc., Stamford, Conn.

[21] Appl. No.: 306,713

[22] Filed: Sep. 15, 1994

[51] Int. Cl.$^6$ ................................................. H04N 7/28
[52] U.S. Cl. ........................... 348/414; 348/422; 348/418
[58] Field of Search ................................... 348/422, 414, 348/417, 418, 413; 395/2.31, 2.3, 2.32; 382/253, 236

[56] References Cited

U.S. PATENT DOCUMENTS

| | | | |
|---|---|---|---|
| 4,072,984 | 2/1978 | Kaiser | 358/31 |
| 4,081,831 | 3/1978 | Tang et al. | 358/114 |
| 4,238,768 | 12/1980 | Mitsuya et al. | 358/135 |
| 4,597,005 | 6/1986 | Baleshta et al. | 358/12 |
| 4,628,344 | 12/1986 | Glenn | 358/12 |
| 4,654,484 | 3/1987 | Reiffel et al. | 379/53 |
| 4,807,298 | 2/1989 | Conte et al. | 582/56 |
| 4,862,261 | 8/1989 | Tanaka | 358/133 |
| 4,922,508 | 5/1990 | Moriya | 375/34 |
| 4,994,927 | 2/1991 | Dixit et al. | 358/426 |
| 5,021,971 | 6/1991 | Lindsay | 348/422 |
| 5,023,910 | 6/1991 | Thomson | 381/37 |
| 5,046,027 | 9/1991 | Taafe et al. | 364/521 |
| 5,060,285 | 10/1991 | Dixit et al. | 382/56 |
| 5,068,723 | 11/1991 | Dixit et al. | 358/133 |
| 5,086,471 | 2/1992 | Tanaka et al. | 381/36 |

(List continued on next page.)

FOREIGN PATENT DOCUMENTS

| | | |
|---|---|---|
| 0112057A2 | 6/1984 | European Pat. Off. . |
| 0331094A2 | 9/1989 | European Pat. Off. . |
| 0424060A2 | 4/1991 | European Pat. Off. . |

OTHER PUBLICATIONS

Dixit et al, Adaptive Vector Quantization of Video for Packet Switched Networks, ICASSP–89, p. 1870–1873 1989.

Feng et al, A Dynamic Address Vector Quantization Algorithm Based on Inter–Block and Inter–Colorrlation for Color Image Coding, ICASSP–89, pp. 1755–1758 1989.

Nasrabadi et al, Interframe Hierarchical Vector Quantization, ICASSP–89 pp. 1739–1742 1989.

Nasrabadi et al, Vector Quantization of Images Based Upon the Kohonen Self–Organizing Feature Maps, ICASSP–89, pp. 101–108 1989.

(List continued on next page.)

*Primary Examiner*—Amelia Au
*Attorney, Agent, or Firm*—Arnold, White & Durkee

[57] ABSTRACT

An improved VQ system for compressing a digital signal produces a compressed signal by dividing the signal to be compressed into a series of signal segments. Each signal segment comprises a plurality of signal values. The improved VQ system uses first and second tables of vector values having different degrees of signal correlation, referred to as a class-1 table and a class-2 table respectively. For a selected signal segment, the VQ system determines a vector Xbar1 representing a difference between the signal values in the selected segment and an average of a selected group of signal values in a preceding segment. For the same signal segment, the method and apparatus determines another vector Xbar2 representing a difference between the signal values in the selected signal segment and an average of a selected group of signal values in the selected signal segment. The vectors Xbar1 and Xbar2 measure different levels of correlation between the signal values of the selected signal segment. The improved VQ system finds an entry in the class-1 table that is a best match for the vector Xbar1, referred to as a class-1 best match entry. The improved VQ system also finds an entry in the class-2 table that is a best match for the vector Xbar2, referred to as a class-2 best match entry. After determining the best match entries, the improved VQ system inserts into a compressed signal stream an identifying code or compressed signal representing a selected one of the class-1 best match entry or the class-2 best match entry.

19 Claims, 6 Drawing Sheets

U.S. PATENT DOCUMENTS

| | | | |
|---|---|---|---|
| 5,124,791 | 6/1992 | Israelsen et al. | 358/136 |
| 5,136,374 | 8/1992 | Jayant et al. | 358/133 |
| 5,136,663 | 8/1992 | Nishio | 382/56 |
| 5,151,968 | 9/1992 | Tanaka et al. | 395/2 |
| 5,166,788 | 11/1992 | Lee | 358/105 |
| 5,172,228 | 12/1992 | Israelsen | 358/133 |
| 5,204,899 | 4/1993 | Israelsen et al. | 380/14 |
| 5,210,798 | 5/1993 | Ekchian et al. | 382/14 |
| 5,225,090 | 10/1993 | Israelsen | 358/133 |
| 5,231,485 | 7/1993 | Israelsen et al. | 358/133 |
| 5,235,418 | 8/1993 | Lucas | 358/133 |
| 5,247,348 | 9/1993 | Israelsen et al. | 358/86 |
| 5,247,357 | 9/1993 | Israelsen | 358/133 |
| 5,263,119 | 11/1993 | Tanaka et al. | 395/2.32 |
| 5,272,529 | 12/1993 | Frederiksen | 358/133 |
| 5,313,534 | 5/1994 | Burel | 382/56 |
| 5,339,164 | 8/1994 | Lim | 358/261.1 |
| 5,341,441 | 8/1994 | Maeda et al. | 382/56 |
| 5,457,495 | 10/1995 | Hartung | 348/417 |

OTHER PUBLICATIONS

Huang et al, A Constrained Vector Quantization Scheme for Real–Time Codebook Retransmission, IEEE, vol. 4, No. 1, Feb. 1994, pp. 1–7.

Ding et al, Optimal Vector Transform for Vector Quantization, IEEE Signal Processing Letters, vol. 1, No. 7, Jul. 1994, pp. 110–113.

Lo et al, New predictive classified vector quantisation scheme for image compression, Elec. Letters, vol. 30, No. 16, Aug. 1994, pp. 1280–1282.

Constantinescu et al, Improved Techniques for Single–Pass Adaptive Vector Quantization, Proc. IEEE, vol. 82, No. 6, Jun. 1994, pp. 933–939.

Rutledge, Variable Block Vector DPCM: Vector Predictive Coding of Color Images, pp. 376–381, reprinted from Proc. IEEE, vol. 1, Jun. 1987.

Ramamoorthy et al, High Quality Image Coding with a Model–Testing Vector Quantizer and a Human Visual System Model, pp. 352–355, reprinted from IEEE Conf. Acoust., vol. 2, Apr. 1988, pp. 1164–1167.

Linde et al, An Algorithm for Vector Quantizer Design, pp. 88–99, reprint from IEEE Trans. Commun., vol. COM–28, Jan. 1980, pp. 84–95.

Hill et al, Interactive Image Query System Using Progressive Transmission, Computer Graphics, vol. 17, No. 3, Jul. 1983, pp. 323–330.

Feng et al, Image Coding Using a Dynamic Multi–Layer Address–Vector Quantization Technique, IEEE Computer Society Press, May 1990, pp. 887–888.

Nasrabadi et al, Interframe hierarchical vector quantization, Optical Engineering, vol. 28, No. 7, Jul. 1989, pp. 717–725.

Intermetall Semiconductors, DIGIT 2000 VLSI Digital TV System, 1985 Edition, pp. 1–237.

Delp et al, Image Compression Using Block Truncation Coding, IEEE Transactions, vol. COM–27, No. 9, Sep. 1979, pp. 1335–1342.

Netravali et al, Picture Coding: A Review, Proceedings of IEEE, vol. 68, No. 3, Mar. 1980, pp. 366–406.

Limb et al, Digital Coding of Color Video Signals –A Review, IEEE Transactions, vol. COM–25, No. 11, Nov. 1977, pp. 1349–1385.

Kruger, Videoteleconferencing—A Communications Tool Whose Time is Coming, Dataquest Inc., Jun. 1984, pp. 1–11.

Anderson et al, Codec squeezes color teleconferencing through digital telephone lines, Electronics, Jan. 1984, 7 pg.

Nasrabadi et al, A Multilayer Address Vector Quantization Technique, IEEE Transactions, vol. 37, No. 7, Jul. 1990, pp. 912–921.

Nasrabadi et al, A Dynamic Finite–State Vector Quantization Scheme, Worcester Polytechnic Institute, IEEE Conf., Apr. 1990, pp. 2261–2264.

Feng et al, A New Variable Rate VQ Coding Scheme Apply in HDTV, SPIE vol. 1360 Visual Communications and Image Processing '90, pp. 826–836.

Feng, An Adaptive Multi–Layer Address–VQ Scheme, IEEE, CH2977, Jul. 1991, pp. 2309–2312.

Feng, A Multi–Layer Address–Vector Quantization Technique, IEEE, CH2829–0109/0000–0893, pp. 320.4.1–320.4.5.

Nasrabadi et al, Image Compression Using Address–Vector Quantization, IEEE Transactions, vol. 38, No. 12, Dec. 1990, pp. 2166–2173.

Dixit et al, Hierarchical Address Vector Quantization for Image Coding, CVGIP: Graphical Models, vol. 53, No. 1, Jan. 1991, pp. 63–70.

Xue et al, High Compression Vector Quantisation Scheme for Image Coding, Electronics Letters, vol. 29, No. 10, May 1993, pp. 839–841.

Sampson et al, Fast lattice–based gain–shape vector quantisation for image–sequence coding, IEE, vol. 140, No. 1, Feb. 1993, pp. 56–66.

Chang et al, Image Coding Using Variable–Rate Side–Match Finite–State Vector Quantization, IEEE, vol. 2, No. 1, Sep. 1993, pp. 104–108.

Kurita et al, A Method of Block Truncation Coding for color Image Compression, IEEE Transactions, vol. 41, No. 9, Sep. 1993 pp. 1270–1274.

Silsbee et al, Visual Pattern Image Sequence Coding, IEEE Transactions, vol. 3, No. 4, Aug. 1993, pp. 291–301.

Marcellin et al, Transform coding of Monochrome and Color Images using Trellis Coded. . . , IEEE, vol. 3, No. 4, Aug. 1993, pp. 270–276.

Hsieh et al, Image Compression Using Finite–State Vector Quantization with . . . , IEEE, vol. 3, No. 5, Oct. 1993, pp. 341–349.

Sullivan et al, Efficient Quadtree Coding of Images and Video, IEEE Transactions, vol. 3, No. 3, May 1994, pp. 327–331.

Bellifemine et al, Video Signal Coding with DCT and Vector Quantization, IEEE, vol. 42, No. 2/3/4, Feb., Mar., Apr. 1994, pp. 200–207.

METHOD AND APPARATUS FOR COMPRESSING A DIGITAL SIGNAL USING VECTOR QUANTIZATION

FIELD OF THE INVENTION

This invention pertains to the encoding of digital signals, such as video sequences and images for transmission and storage. In particular, it pertains to the compression and reconstruction of the digital signals using a new vector quantization scheme.

BACKGROUND OF THE INVENTION

Vector quantization (VQ) has been applied to speech coding and image coding for a number of years. In its basic form, as illustrated in the block diagram of FIG. 1 for image coding, an image is divided into blocks of N×N picture elements or signal values (pixels). The encoder 2 and decoder 4 each have identical codebooks 6 and 8 containing various entries or vectors of signal values. The codebooks 6 and 8 are created by training them over a large set of particular test images of different types. During the image coding process, a selected block of signal values $\hat{X}i$ for the actual image being compressed is compared with entries 10 in the codebook 6 of the encoder 2, and the address of the entry 10 which best matches the image being compressed or encoded is transmitted to the decoder 4. The received address is used to fetch the corresponding entry 12 from the codebook 8, which is then used to reconstruct the selected block with signal values $\hat{X}\hat{R}i$ for the image. For such a compression system, high quality performance is difficult to achieve, especially in the sharp transition areas of the image to be compressed.

Other vector quantization methods, such as the simplified VQ used by Comsat Labs, provide better quality but require a higher bit rate (i.e., a lower compression ratio). Moreover, these systems can exhibit a blocky-effect on the low transition areas of the image. Another compression technique uses a hierarchial codebook structure in which each level or hierarchy of codebooks corresponds to a different block size. The hierarchial approach provides good quality but also has a high bit rate due to the hierarchial codebook structure. A good review of vector quantization can be found in Gray, IEEE ASSP. Magazine, April 1984, pp. 4–29.

Thus, a need exists for an improved VQ system for compressing a digital signal to produce a high quality signal from the compressed signal while maintaining a low bit rate and simple decoder design.

SUMMARY OF THE INVENTION

A principle object of this invention is to provide an adaptive vector quantization system for compressing signals, such as video and still image signal values, that result in high quality signals.

Another object of the present invention is to provide an improved VQ system for compressing signals that result in high quality signals while maintaining a low bit rate.

Still another object of the present invention is to provide an improved VQ system that can use a simple decoder design.

A further object of the present invention is an improved VQ system which reduces the blocky-effect of previous image coding systems.

The improved VQ system accomplishes this and other objects by using a novel codebook structure having different table classes of different signal correlations, and each table class has entry vectors with a common level of signal correlation. For compressing a signal segment, the improved VQ system measures different levels of signal correlation between the signal values of the signal segment and compares the different measured signal correlations for the signal segment with the entries in the different classes of tables. The improved VQ system finds the best match entries of the different classes of tables when compared with the corresponding measured signal correlations for the signal segment. The improved VQ system dynamically selects an identifying code of the appropriate best match entry to insert into a compressed signal stream.

In accordance with the principles of the present invention, an improved VQ system for compressing a digital signal produces a compressed signal by dividing the signal to be compressed into a series of signal segments. Each signal segment comprises a plurality of signal values. The improved VQ system uses first and second tables of vector values having different degrees of signal correlation, referred to as a class-1 table and a class-2 table respectively.

For a selected signal segment, the VQ system determines a vector Xbar1 representing a difference between the signal values in the selected segment and an average of a selected group of signal values in a preceding segment. For the same signal segment, the method and apparatus determines another vector Xbar2 representing a difference between the signal values in the selected signal segment and an average of a selected group of signal values in the selected signal segment. The vectors Xbar1 and Xbar2 measure different levels of correlation between the signal values of the selected signal segment. The improved VQ system finds an entry in the class-1 table that is a best match for the vector Xbar1, referred to as a class-1 best match entry. The improved VQ system also finds an entry in the class-2 table that is a best match for the vector Xbar2, referred to as a class-2 best match entry. After determining the best match entries from the two classes of entries, the improved VQ system inserts the compressed signal or identifying code representing a selected one of the class-1 best match entry or the class-2 best match entry into the compressed signal stream.

In accordance with an aspect of the present invention, the improved VQ system determines respective error values for each of the class-1 best match entry and the class-2 best match entry. If the respective error values exceed a specified quality index, referred to as K, then the improved VQ system inserts into the compressed signal stream a lossless compressed signal segment that represents all of the signal values of the signal segment. Otherwise, the improved VQ system inserts the identifying code of the selected best match entry into the compressed signal stream. Furthermore, the quality index can vary depending on the portion of the signal to be compressed. For example, for a certain area of an image, K can be zero to lossless compress that area of the image. Additionally, the invention includes a post-processing technique to cure signal fluctuations in the signal constructed from the compressed signal stream.

BRIEF DESCRIPTION OF THE DRAWINGS

Other aspects and advantages of the present invention may become apparent upon reading the following detailed description and upon reference to the drawings in which.

Figure 1:
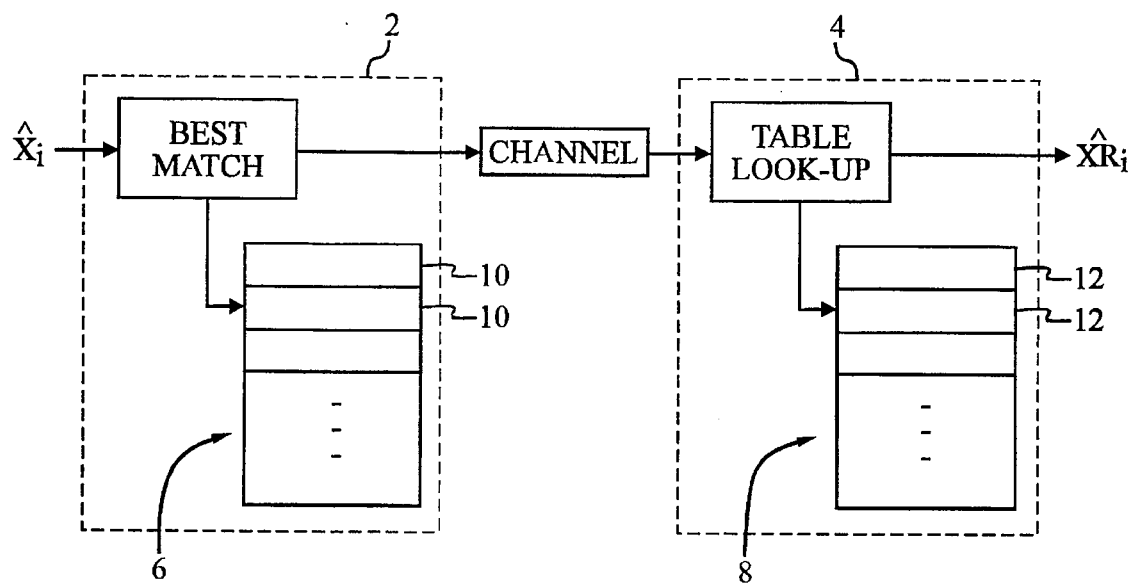
FIG. 1 shows a prior art VQ system.

While the invention is susceptible to various modifications and alterative forms, specifics thereof have been shown by way of example in the drawings and will be described in detail. It should be understood, however, that the intention is not to limit the invention to the particular embodiment described. On the contrary, the intention is to cover all modifications, equivalents, and alternatives falling within the spirit and scope of the invention as defined by the appended claims.

DESCRIPTION OF THE PREFERRED EMBODIMENT

This invention pertains to a vector quantization-based image compression technique. In accordance with an embodiment of the present invention, the improved VQ system compresses digital signal representing different characteristics of image sequences and a still image being compressed. The improved VQ system involves a hybrid approach which relies on using different classes of codebook tables and switching between them to enable high quality coding of a wide variety of images and image sequences.

Figure 2:
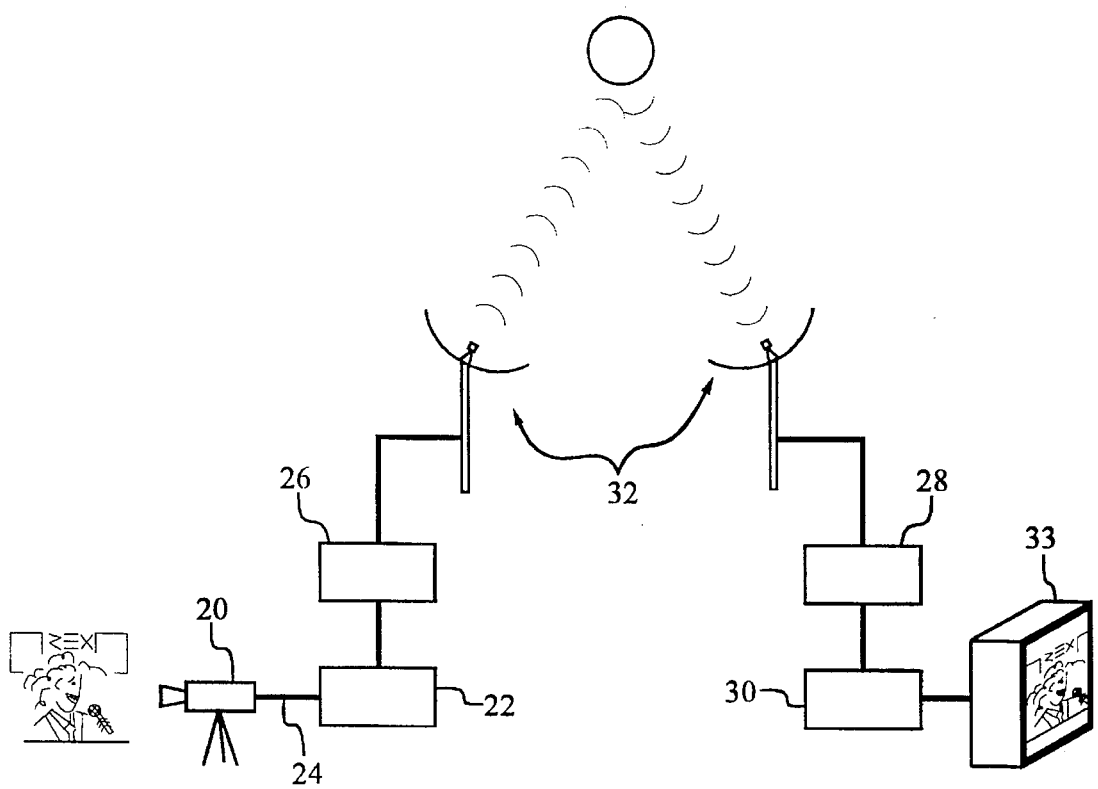
FIG. 2 shows an environment in which the improved VQ system of the present invention can be utilized.

FIG. 2 shows an environment in which the improved VQ system can be utilized according to the principles of the present invention. An imaging configuration 20 (such as an x-ray imager, video camera, computer, scanner, etc.) is linked to an encoder 22. The imaging configuration 20 produces a digital signal representing a video image which is received by the encoder 22 through link 24. The link 24 can be a cable, satellite link, radio frequency, twisted pairs, or fiber optics. The encoder 22 includes an ASIC (application specific integrated circuit) and storage (not shown) to implement the improved VQ system. Alternatively, the encoder can include a variety of processing circuitry and storage to implement the improved VQ system, such as a microprocessor coupled to a ROM or other memory. The encoder 22, utilizing the improved VQ system as described below, compresses the digital signal. The encoder 22 is coupled to a transmitter 26 which transmits the compressed signal stream to a receiver 28 which is coupled to a decoder 30. The transmitter 26 and receiver 28 can be linked by a variety of ways, such as satellite link 32, a cable link (not shown), radio frequency (not shown), twisted pairs (not shown) or fiber optics (not shown). The decoder 30 uses the compressed signal stream as described below to construct the digital signal representing the image. The decoder 30 is linked to a display configuration 33 which displays the constructed image.

Some VQ systems compress an image signal by relying on a block of pixels that are highly correlated. As such, a VQ system can design a finite set of entries (vector) in the codebook to represent the whole image. But for certain image areas, such as sharp edge area, this form of VQ provides a low quality image. The reason is that pixels in those areas are not highly correlated, and the codebook does not contain a vector to accurately represent those areas of the image. The improved VQ system provides different classes of tables with vectors having different degrees of correlation.

Figure 3:
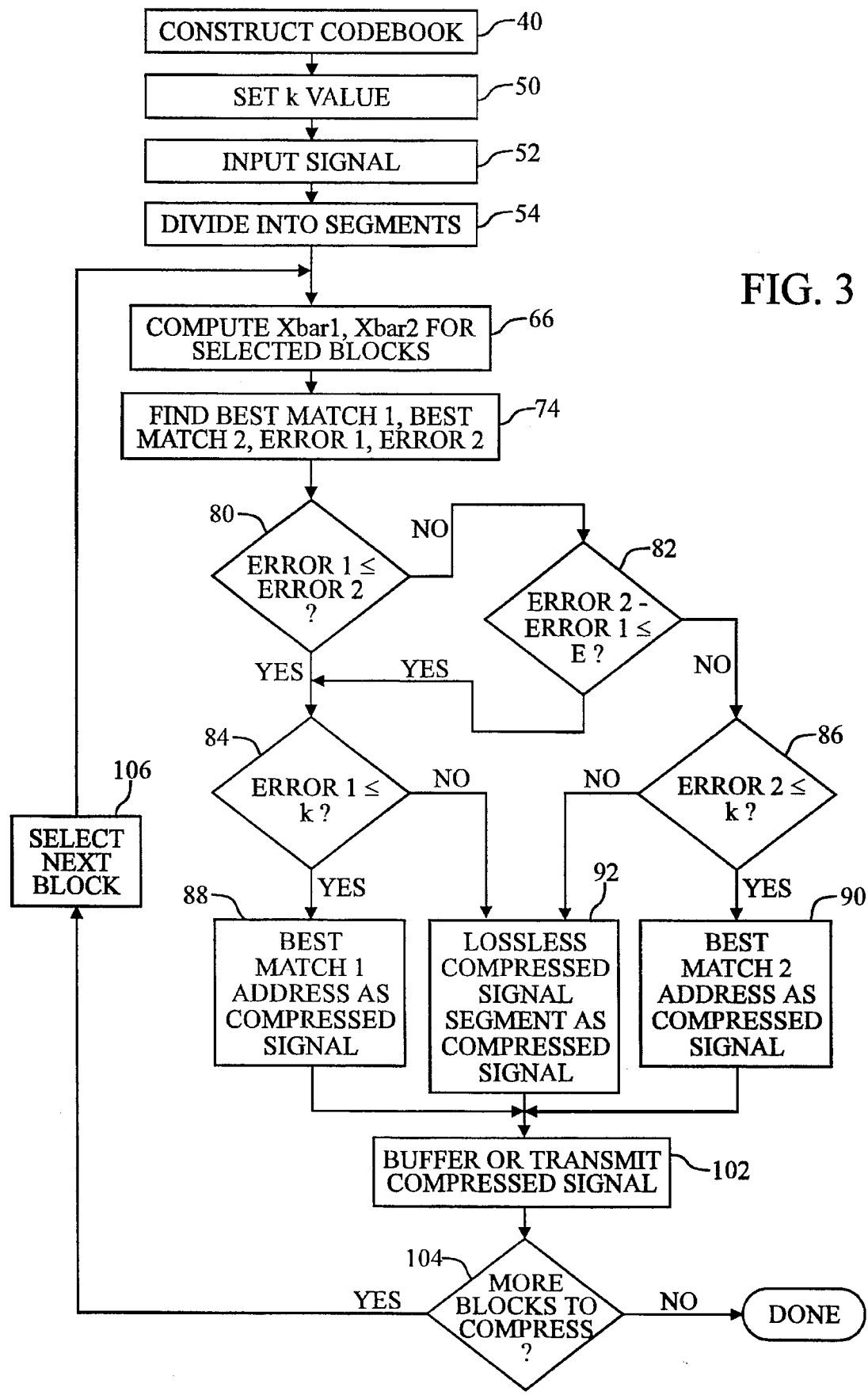
FIG. 3 shows a flow chart diagram for the improved VQ system according to principles of the present invention.

FIG. 3 shows a flow diagram of the operation of the improved VQ system according to the principles of the present invention. Initially, as shown at step 40, a "codebook" for looking up vectors or table entries is provided, e.g., in a ROM or other suitable storage device.

Figure 4:
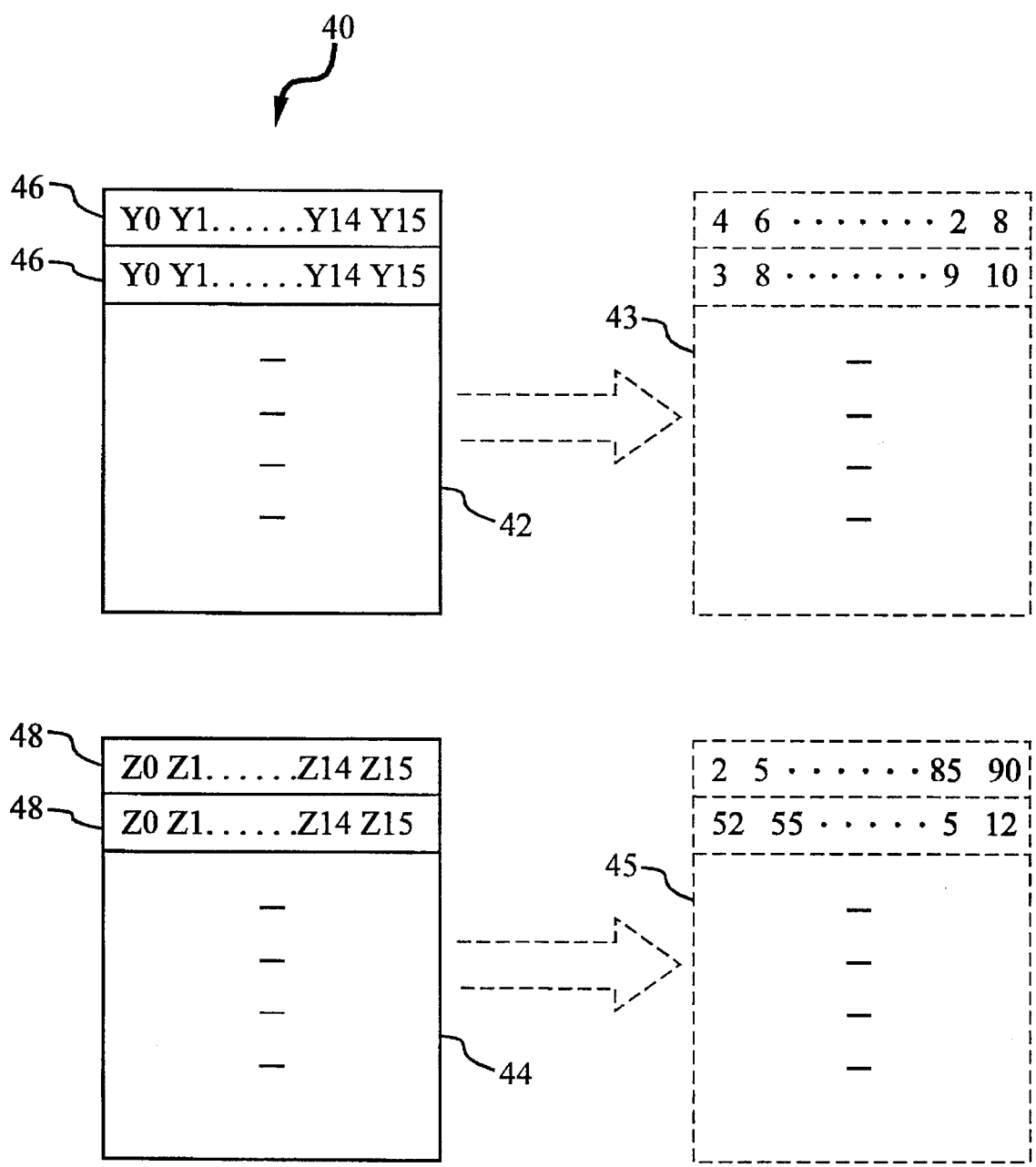
FIG. 4 shows a codebook used by the improved VQ system with two classes of tables.

Referring to FIG. 4 of the illustrative example, the codebook 40 is shown in the abstract as tables 42 and 44 with specific (hypothetical) numbers filled in as tables 43 and 45. The tables 42 and 44 are referred to as a class-1 table and a class-2 table, respectively. The class-1 table contains entries or vectors corresponding to a group of signal values with similar characteristics, such as signal values that are highly correlated. For example, signal values representing an area in an image with comparatively low variation. The class-2 table contains entries 48 correspond to a group of signal values that represent an area in an image with a relatively sharp variation or transition.

The tables 42 and 44 are codebook tables as described in more detail in, e.g., Y. Linde, A. Buzo and R. M. Gray, "An Algorithm for Vector Quantizer Design," IEEE Trans Communication, Vol. COM-28, January 1980, pp. 84–95. The tables 42 and 44 are constructed from test signals, and the entries 46 and 48 correspond to signal vectors with different levels of signal correlation for blocks of the selected size from a variety of test signals. For example, each entry 46 in the table 42 has 16 vector elements $Y0 \ldots Y15$ derived from 16 signal values in a test block that are highly correlated, and each entry 48 in the table 44 has 16 vector elements $Z0 \ldots Z15$ derived from 16 signal values in a test block that have a different degree of correlation. In the illustrated embodiment, two class of vectors were formed by using a clustering method such as the LBG method, or a simulated annealing method.

In the illustrative embodiment, the class-1 table 42 has approximately 1,000 entries and the class-2 table 44 approximately 15,000 entries. The number of entries will vary with the quality of image compression desired. In a video-teleconferencing implementation, for example, comparatively few entries may be needed because a lower quality of image compression will be acceptable.

As shown in FIG. 3 at step 50, the improved VQ system selects a quality index K which is user selectable and coding area dependent at the beginning of the coding process. The quality index K for an area of the signal designates the tolerable error between the table entries 46 and 48 and the signal to be compressed.

Figure 5:
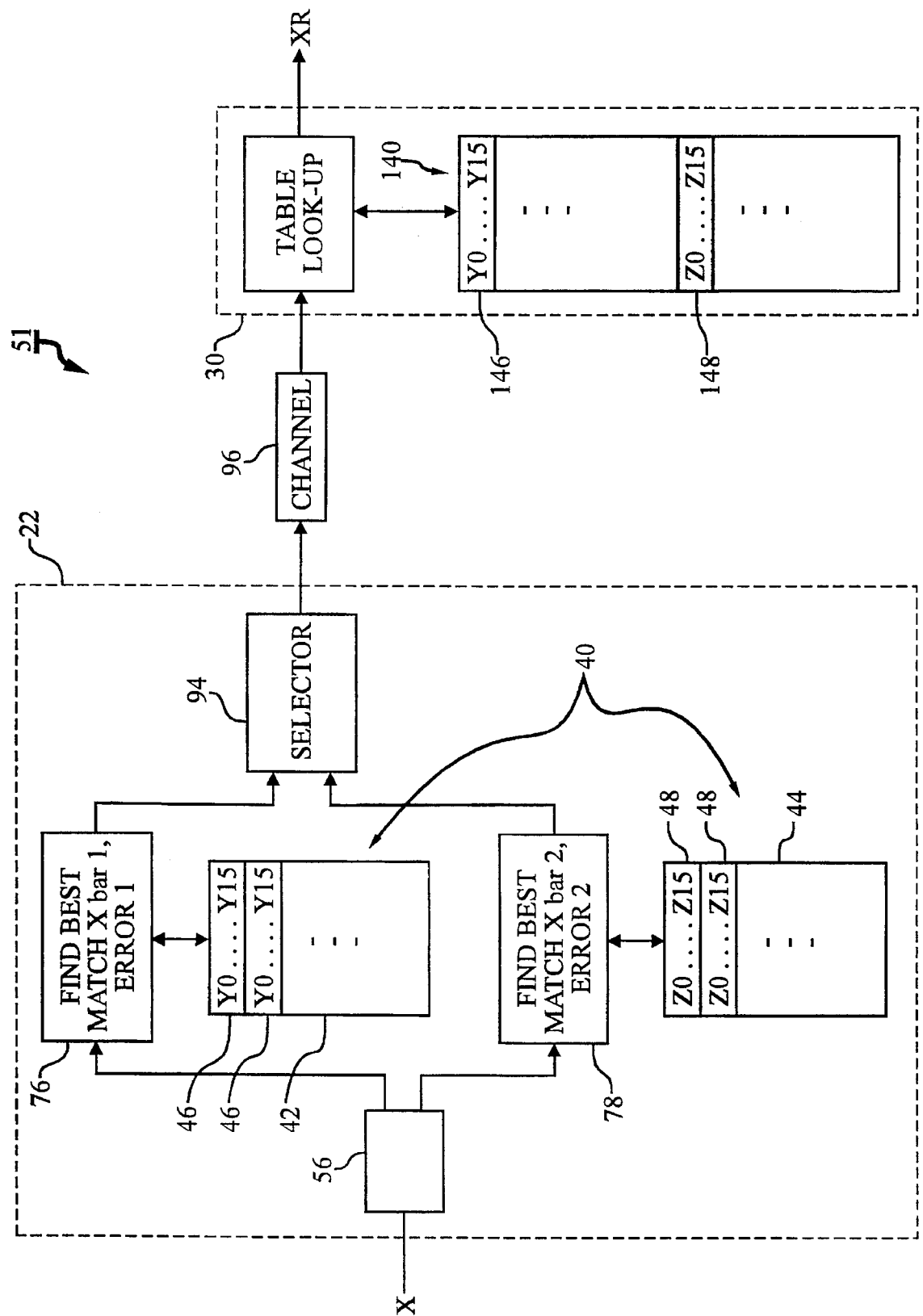
FIG. 5 shows a block diagram generally showing an improved VQ system in accordance with the principles of the present invention.

FIG. 5 shows a block diagram of the improved VQ system 51 which can operate according to the flow diagram of FIG. 3. As shown in step 52 of FIG. 3, the improved VQ system receives the digital video signal X or other graphic-image signal to be compressed. The signal to be compressed may be received from any of a variety of sources, e.g., a conventional video camera, a CCD camera, a video tape recorder, a CD-ROM, a digitizer, a computer, a scanner or an x-ray imager. (An audio signal can also be compressed according to the principles of the present invention.) The signal X is received from the source by the improved VQ system through a communication link, such as a cable, satellite link, radio frequency, twisted pairs or fiber optic.

As shown in step 54 of FIG. 3 and block 56 of FIG. 5, the improved VQ system divides the digital signal X into a series of N×N signal segments or blocks of pixels or signal values. As such, the block 56 represents storage and processing elements for manipulating the digital signal X and for measuring the different levels of signal correlation for the signal values of a selected block of the digital signal X. The selected size of the blocks depends on performance considerations, but, for this embodiment, the number of vector elements in the entries of the codebook tables correspond to the number of signal values in the block. As such, as described above for this embodiment, the entries 42 and 44 contain 16 signal values, so the digital signal is preferably divided into a series of 4×4 signal segments or blocks, e.g., into a series of 4×4 blocks of 16 signal values. Alternatively, other signal segment configurations are possible, such as a one-dimensional array of 16 signal values, depending on the particular application.

Figure 6:
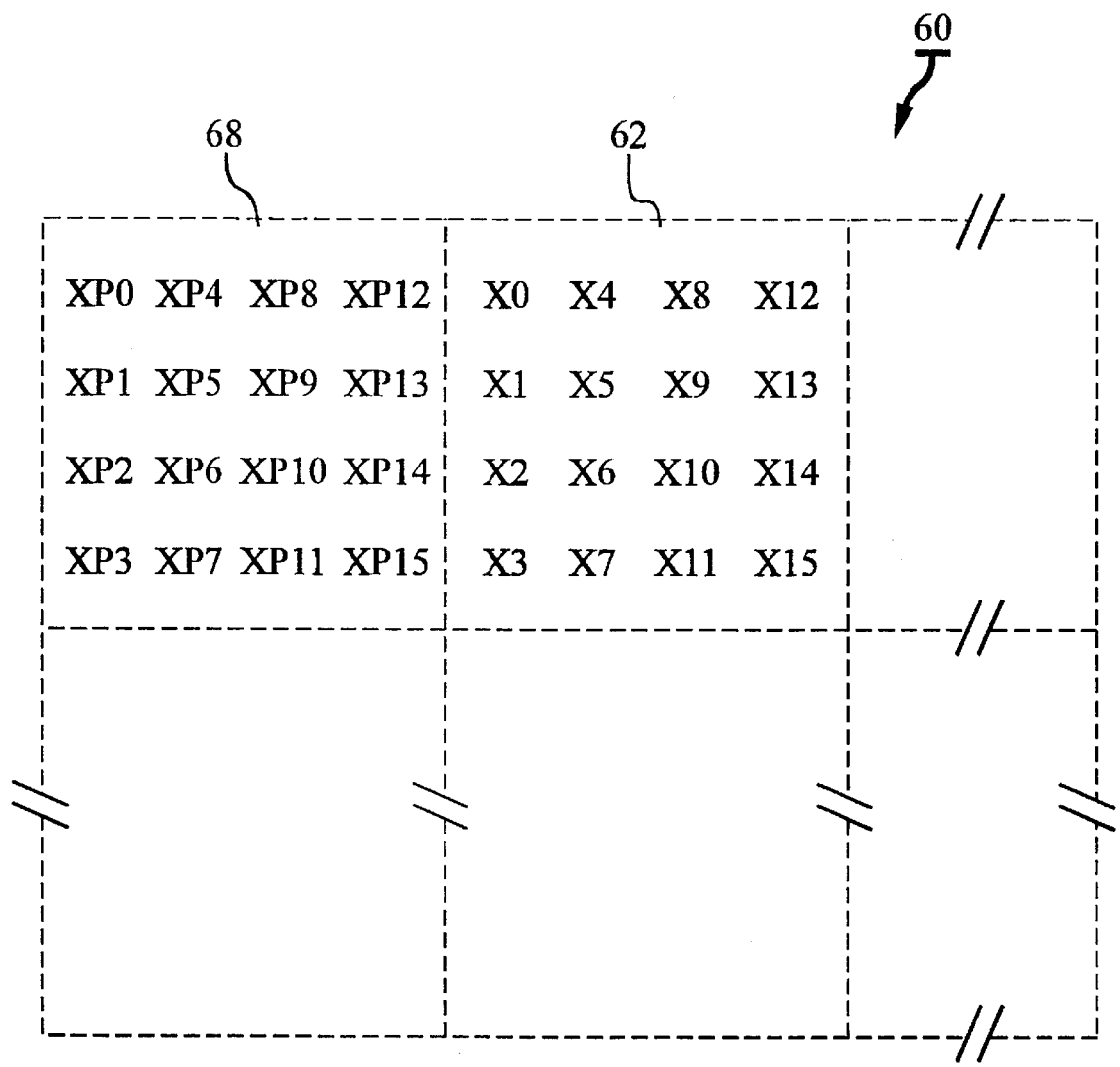
FIG. 6 shows how the improved VQ system measures different levels of signal correlation for the signal values of the selected block of an image.

FIG. 6 represents a video signal or image 60 being compressed and divided into 4×4 blocks. Each block comprises a plurality of signal values, and each signal value represents a pixel value in the video image 60. A signal value, e.g., a pixel value in a video image can be a scaler or a vector, e.g., a combination of brightness, hue, and the like, as well known to those of ordinary skill. The signal block 62 shows 4 columns and 4 rows of signal or pixel values X0 . . . X15. During the coding process, as shown in Step 66 of FIG. 3 and the block 56 of FIG. 5, the improved VQ system calculates vectors Xbar1 and Xbar2 for the selected or current block 62. For the signal values X0 . . . X15 in the current block 62, the vector Xbar1 measures the level of signal correlation associated with table 42 while the vector Xbar2 measures the level of signal correlation associated with table 44.

In this embodiment, to compute Xbar1 for the current block 62, the vector Xbar1 for the selected block 62 represents the difference between the signal values X0 . . . X15 in the selected block 62 and an average of a selected group of signal values XP12 . . . XP15 in a preceding block 68. The vector Xbar1 is determined according to equation (1) resulting in the 16 element vector Xbar1:

$$Xbar1 = Xi - (XP12 + XP13 + XP14 + XP15)/4, \text{ for } i=0 \ldots 15. \quad (1)$$

Initially, in this embodiment, the vector Xbar1 for the first block utilizes a grouping of signal values within the first block because a preceding block does not exist. For example, in FIG. 6, if the preceding block 68 were the first block, then the vector Xbar1 for the initial block 68 would be calculated by the equation (2):

$$Xbar1 = XPi - (XP0 + XP1 + XP2 + XP3)/4, \text{ for } i=0 \ldots 15. \quad (2)$$

The vector Xbar2 for the selected block 62 measures a different level of signal correlation between the signal values X0 . . . X15 in the block 62. In this embodiment, the vector Xbar2 represents a difference between the signal values X0 . . . X15 in the block 62 and an average of all of the signal values X0 . . . X15 in the block 62. The average of all of the signal values X0 . . . X15 is calculated according to equation (3):

$$X_{avg} = \frac{\sum_{i=0}^{15} Xi}{16} \quad (13)$$

The vector Xbar2 is determined according to equation (4) which results in a 16 element vector:

$$Xbar2 = Xi - X_{avg}, \text{ for } i=0 \ldots 15. \quad (4)$$

As shown in step 74 of FIG. 3 and block 76 of FIG. 5, the improved VQ system interrogates the class-1 table 42 to find an entry 46 that is a best match for the vector Xbar1, referred to as a class-1 best match entry. The class-1 best match entry can be found by determining which entry 46 in the class-1 table has the lowest code error with respect to the vector Xbar1. The code error for an entry can be calculated using a least mean squared calculation between a class-1 entry and Xbar1, but the calculation of the code error for a class-1 entry can be accomplished in a variety of ways.

As shown in step 74 of FIG. 3 and block 78 of FIG. 5, the improved VQ system also interrogates the class-2 table 44 at the same time as the class-1 table 42 is interrogated to find an entry 48 in the class-2 table that is a best match for the vector Xbar2, referred to as a class-2 best match entry. Similar to the class-1 best match entry, the class-2 best match entry can be found by determining which entry 48 in the class-2 table has the lowest code error with respect to the vector Xbar2. The code error for an entry can be calculated using a least mean squared calculation between a class-2 entry and Xbar2, but the calculation of the code error for a class-2 entry can also be accomplished in a variety of ways.

After finding the class-1 and class-2 best match entries, a selection is made between them as shown in steps 80 and 82 of FIG. 3 and block 94 of FIG. 5. This embodiment of the improved VQ system selects the class-2 best match entry if (i) the error value for the class-2 best match entry is less than the error value for the class-1 best match entry and (ii) the respective error values differ by more than a specified difference, else selecting the class-1 best match entry. The class-1 best match entry is selected even if its error value exceeds the error value for the class-2 best match entry but is within the specified difference value because the selection of the class-1 best match entry will result in better performance for the improved VQ system. The specified difference can be any value depending on the class definitions and the specific application. Alternatively, the selection of the class-1 best match entry or a class-2 best match entry can vary depending on the application and performance considerations. For example, the improved VQ system could simultaneously interrogate the class-1 and class-2 tables, and if a class-1 entry is found with an acceptable error code, then the improved VQ system could stop interrogating the tables and immediately insert the identifying code for that entry into the compressed signal stream, thereby reducing the quality of the constructed image but improving the performance of the system.

Figure 7:
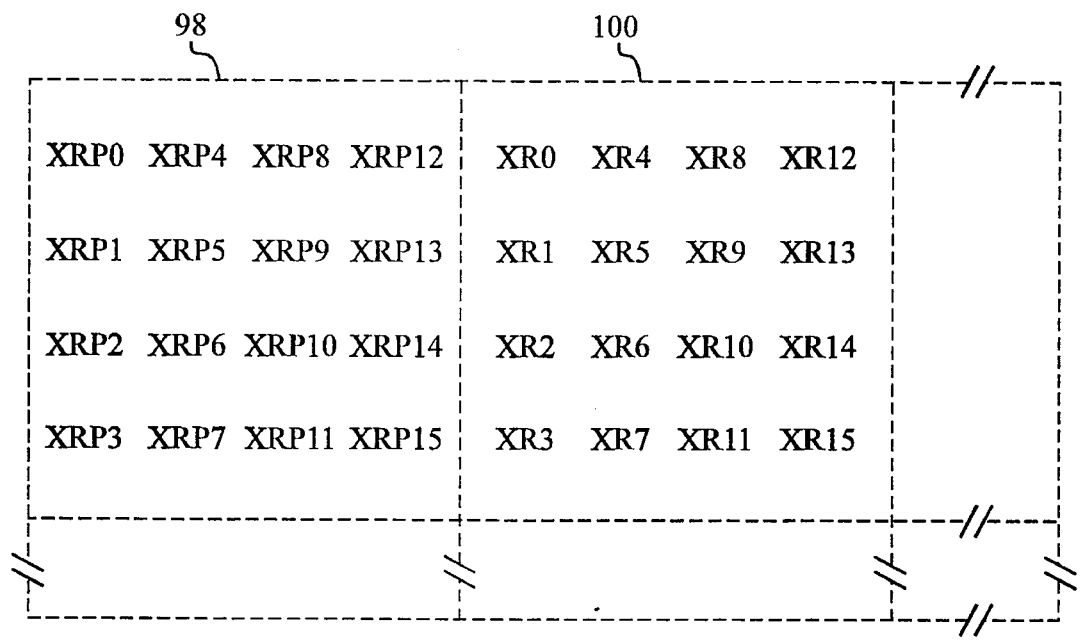
FIG. 7 shows the reconstruction of the blocks of the image using the improved VQ system.

As shown in FIG. 5, an identifying code or address for the selected best match entry becomes the compressed signal, which is part of the compressed signal stream, and is sent to a communication link or channel 96 to a decoder 30. The identifying code is eventually received by the decoder 30 to identify the corresponding entry 146 or 148 in a codebook 140 kept by the decoder 30. The decoder uses the identifying code to obtain the corresponding entry 146 or 148 from its codebook 140. Assuming the block 68 (FIG. 6) is the initial block in the digital signal, if the identifying code identifies a class-1 entry 46 in the decoder codebook 140, then, as shown in FIG. 7, the decoder 30 constructs a block 98 using the equation (5):

$$XRPi = Yi + Xbar1, \text{ for } i=0\ldots 15; \quad (5)$$

where Yi is the vector element of the class-1 entry 46 and Xbar1 is calculated as described above for the first block 68. If the identifying code identifies a class-2 entry 48, then the decoder 30 constructs the block 68 using the equation (6):

$$XRPi = Zi + Xbar2, \text{ for } i=0\ldots 15; \quad (6)$$

where Zi is the vector element of the class-2 entry 48 and Xbar2 is calculated as described above.

For the current block 62, the identifying code of the selected best match entry is inserted into the compressed signal stream along with a delta value. In this embodiment, Delta1 is calculated according to the equation (7):

$$Delta1 = (XP12 + XP13 + XP14 + XP15)/4 - (XRP12 + XRP13 + XRP14 + XRP15)/4. \quad (7)$$

Delta2 is calculated according to the equation (8):

$$Delta2 = Xavg - (XRP12 + XRP13 + XRP14 + XRP15)/4, \quad (8)$$

where Xavg is the average of all the signal values in block 62.

If the identifying code for the best match entry of the current block 62 identifies a class-1 entry 46, then the identifying code is inserted into the compressed signal stream along with Delta1. If the identifying code identifies a class-2 entry 48, then the identifying code is inserted into the compressed signal stream along with Delta2. The delta value is used to compensate the entry 46 or 48. In this embodiment, the decoder 30 uses the values of the previously constructed block 98 to accurately construct the selected block 62. The improved VQ system can obtain the XRP values for the previous block 68 from a decoder (not shown) coupled to the encoder on the encoder side of the improved VQ system.

In this embodiment, if the identifying code for the block 62 identifies a class-1 entry 46, the decoder constructs current block 100 according to the equation (9):

$$XRi = Yi + Delta1 + (XRP12 + XRP13 + XRP14 + XRP15)/4, \text{ for } i=0\ldots 15. \quad (9)$$

If the identifying code for the block 62 identifies a class-2 entry 48, the decoder constructs current block 100 according to the equation (10):

$$XRi = Zi + Delta2 + (XRP12 + XRP13 + XRP14 + XRP15)/4, \text{ for } i=0\ldots 15. \quad (10)$$

Thus, a high quality signal is reproduced by the decoder 30 from compressed signals in a compressed signal stream.

Additionally, as shown in steps 84 to 92 of FIG. 3, if the respective error values for the class-1 best match entry and class-2 best match entry both exceed a specified quality index, referred to as K, the improved VQ system inserts lossless compressed signal values into the compressed signal stream that represent all of the signal values of the block for lossless decoding. If the error value for the selected best match entry does not exceed K, the improved VQ system inserts into the compressed signal stream the identifying code or address of the selected best match entry as described above. Additionally, K can be a function of the position of a block on the image. As such, for certain predefined areas, K can vary or be equal to zero.

As shown in step 102 of FIG. 3, the appropriate compressed signal (i.e. the identifying code or the lossless compressed signal) is inserted into the compressed signal stream. This can be accomplished by buffering the compressed signal and transmitting the compressed signal as part of the compressed signal stream. The improved VQ system then determines whether there are more blocks of signal values to compress as shown by decisional step 104 and, if so, selects the next block of signal values as shown by step 106. If not, the system has no more blocks to compress. Alternative embodiments are encompassed by the present invention. For example, after determining the appropriate code for the selected block to insert into the compressed signal stream, the improved VQ system could immediately transmit the appropriate code or compressed signal to the decoder 30, or the compressed signal can be stored in a buffer for hardware/software manipulation or for transmission/synchronization purposes. Alternatively, the compressed signal could be stored in a buffer, and the compressed signal is transmitted to the decoder 30 before the buffer is full. The compressed signal could also be transmitted to the decoder 30 when the buffer is full. As such, compressed signals of identifying codes or lossless compressed signal values, which can represent a block, several blocks, a screen, or multiple frames, are inserted into the compressed signal stream and transmitted to the decoder 30.

Figure 8A:
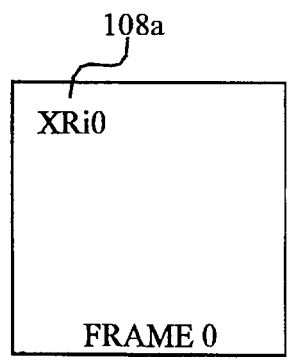
FIGS. 8a–c shows how the described post-processing technique according to an aspect of the present invention cures signal fluctuations.
Figure 8B:
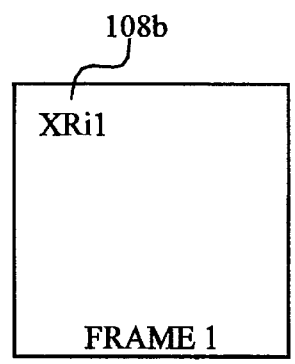
Figure 8C:
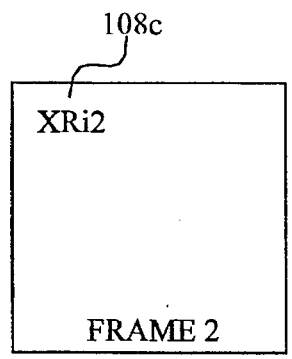

Furthermore, with reference to FIG. 8a–c, the improved VQ system of the present invention uses a post-processing technique to correct fluctuations, known as the mosquito effect, in signal value 108 of three different frames of an image signal. According to the post-processing technique, if $ABS[XRi0-XRi1] < E$;

if $ABS[XRi0-XRi2] < E$; and if $ABS[XRi1-XRi2] < E$, then any fluctuation in the block 108 is probably due to the mosquito effect and not movement. If (i) $XRi1 > XRi0$ and $XRi2 < XRi1$ or (ii) if $XRi1 < XRi0$ and $XRi1 < XRi2$, then there is an impermissible fluctuation and a filter is applied to the three frames of the signal value 108 to smooth out the fluctuation. In one embodiment, a medium filter is applied to the three signal values which rearranges the signal values 108a–c in either ascending or descending order to smooth out the signal fluctuation.

Thus, the present invention provides a high quality signal from a compressed signal while maintaining a low bit rate by using a dynamic switch between classes of tables. The tables contain entries representing signal values with different signal correlations for a signal segment, but each table contains entries representing signal values of similar signal correlation for the signal segment. The improved VQ system has been specifically described as compressing a digital video signal, but the improved VQ system can compress any digital signal (such as audio). Moreover, a signal segment can have a variety of different configurations depending on the application. Furthermore, the methods for constructing the codebook tables and for measuring signal correlation of signal values in a signal segment to form the correlation vectors described as XBar1 and XBar2 can vary. Additionally, in some embodiments, the relationship between the number of elements in the codebook table entries and the number of signal values in a signal segment can also vary.

I claim:

1. A method for compressing a digital signal to produce a compressed signal stream, comprising the steps of:

providing a first table of vectors having a first degree of intraframe signal correlation and a second table of vectors having a second degree of intraframe signal correlation, referred to as a class-1 table and a class-2 table respectively;

dividing said digital signal into a series of segments, each segment comprising a plurality of digital signal values;

determining a first vector Xbar1 for a selected segment having said first degree of intraframe signal correlation for the signal values in said selected segment;

determining a second vector Xbar2 for said selected segment having said second degree of intraframe signal correlation for the signal values in said selected segment;

finding an entry in said class-1 table that is a best match for said vector Xbar1, referred to as a class-1 best match entry;

finding an entry in said class-2 table that is a best match for said vector Xbar2, referred to as a class-2 best match entry;

inserting into said compressed signal stream an identifying code, said identifying code representing a selected one of said class-1 best match entry or said class-2 best match entry.

2. The method of claim 1 wherein said step of determining Xbar1 includes taking the difference between the signal values in said selected segment and an average of a selected group of signal values in a preceding segment.

3. The method of claim 1 wherein said step of determining Xbar2 includes taking the difference between the signal values in said selected segment and an average of a selected group of signal values in said selected segment.

4. The method of claim 1, wherein (1) said digital signal is a graphic-image signal, and (2) each digital signal value represents one or more characteristics of a pixel.

5. The method of claim 1, wherein said digital signal is an audio signal.

6. The method of claim 1, wherein said first and second tables of vectors are generated using an LBG method.

7. The method of claim 2, wherein: (1) each of said selected segment and said preceding segment is a 4×4 block, and (2) said average of a selected group of signal values in said preceding segment is an average of a column in said preceding segment that is adjacent to said selected segment.

8. The method of claim 3, wherein: (1) each of said selected segment and said preceding segment is a 4×4 block, and (2) said average of a selected group of signal values in said selected segment is an average of all signal values in said selected segment.

9. The method of claim 1, wherein said selected one of said best match entries is chosen by: (1) determining respective error values for each of said class-1 best match entry and said class-2 best match entry, and (2) selecting said class-2 best match entry if (i) the error value for said class-2 best match entry is less than the error value for said class-1 best match entry and (ii) said respective error values differ by more than a specified difference, else selecting said class-1 best match entry.

10. The method of claim 9, wherein said respective error values are determined by computing a least-squares distance between, respectively, (1) said class-1 best match entry and said vector Xbar1, and (2) said class-2 best match entry and said vector Xbar2.

11. The method of claim 1, wherein said identifying code represents an address of said selected best match entry.

12. The method of claim 1, wherein said class-1 table and said class-2 table form respective portions of a single codebook.

13. The method of claim 1, further comprising the step of transmitting said identifying code to a decoder.

14. The method of claim 13, further comprising the step of decompressing said identifying code.

15. A method of compressing a digital graphic-image signal to produce a compressed signal stream, comprising the steps of:

providing a codebook comprising first and second tables of vector entries having different degrees of signal correlation, referred to as a class-1 table and a class-2 table respectively;

dividing said digital signal into a series of 4×4 blocks, each block comprising a plurality of digital signal values, each said digital signal values representing one or more characteristics of a pixel;

determining a vector Xbar1 for a selected block representing a difference between the signal values in said selected block and an average of a selected group of signal values in a preceding block;

determining a vector Xbar2 for said selected block representing a difference between the signal values in said selected block and an average of all of said signal values in said selected block;

finding an entry in said class-1 table that is a best match for said vector Xbar1, referred to as a class-1 best match entry;

finding an entry in said class-2 table that is a best match for said vector Xbar2, referred to as a class-2 best match entry;

selecting one of said best match entries by: (1) determining respective error values for each of said class-1 best match entry and said class-2 best match entry, and (2) selecting said class-2 best match entry if (i) the error value of said class-2 best match entry is less than the error value for said class-1 best match entry and (ii) said respective error values differ by more than a specified difference, else selecting said class-1 best match entry;

said respective error values being determined by computing a least-squares distance between, respectively, (1) said class-1 best match entry and said vector Xbar1, and (2) said class-2 best match entry and said vector Xbar2; and if both of said respective error values exceed a specified quality index, referred to as K, then inserting into said compressed signal stream a lossless compressed signal segment that represents the signal values of said selected block, else inserting into said compressed signal stream an identifying code of said selected best match entry;

transmitting said compressed signal stream to a decoder; and at said decoder, decompressing said compressed signal stream into a decompressed graphic-image signal.

16. A method of compressing a signal to produce a compressed signal stream, comprising the steps of:

providing first and second tables of vector entries having different degrees of signal correlation, referred to as a class-1 table and a class-2 table respectively;

dividing said digital signal into a series of segments, each segment comprising a plurality of digital signal values, each said segment having a quality index, referred to as K;

designating one or more of said segments as having a K of zero;

determining a vector Xbar1 for a selected segment representing a first degree of signal correlation for the signal values in said selected segment;

determining a vector Xbar2 for said selected segment representing a second degree of signal correlation for the signal values in said selected segment;

finding an entry in said class-1 table that is a best match for said vector Xbar1, referred to as a class-1 best match entry;

finding an entry in said class-2 table that is a best match for said vector Xbar2, referred to as a class-2 best match entry;

selecting one of said best match entries by: (1) determining respective error values for each of said class-1 best match entry and said class-2 best match entry, and (2) selecting said class-2 best match entry if (i) the error value for said class-2 best match entry is less than the error value for said class-1 best match entry and (ii) said respective error values differ by more than a specified difference, else selecting said class-1 best match entry;

if both of said respective error values exceed the K for said selected segment, then inserting into said compressed signal stream a lossless compressed signal segment that represents all of the signal values of said selected segment, else inserting into said compressed signal stream an address of said selected one of said best match entries.

17. An improved VQ system for compressing a digital signal to produce a compressed signal stream, comprising the steps of:

means for providing a first table of vectors having a first degree of intraframe signal correlation and a second table of vectors having a second degree of intraframe signal correlation, referred to as a class-1 table and a class-2 table respectively;

means for dividing said digital signal into a series of segments, each segment comprising a plurality of digital signal values;

means for determining a first vector Xbar1 for a selected segment having said first degree of intraframe signal correlation for the signal values in said selected segment;

means for determining a second vector Xbar2 for said selected segment having said second degree of intraframe signal correlation for the signal values in said selected segment;

means for finding an entry in said class-1 table that is a best match for said vector Xbar1, referred to as a class-1 best match entry;

means for finding an entry in said class-2 table that is a best match for said vector Xbar2, referred to as a class-2 best match entry;

means for inserting into said compressed signal stream an identifying code, said identifying code representing a selected one of said class-1 best match entry or said class-2 best match entry.

18. An improved VQ system for compressing a digital graphic-image signal to produce a compressed signal stream, said system comprising:

means for providing a codebook comprising first and second tables of vector entries having different degrees of signal correlation, referred to as a class-1 table and a class-2 table respectively;

means for dividing said digital signal into a series of 4×4 blocks, each block comprising a plurality of digital signal values, each said digital signal values representing one or more characteristics of a pixel;

means for determining a vector Xbar1 for a selected block representing a difference between the signal values in said selected block and an average of a selected group of signal values in a preceding block;

means for determining a vector Xbar2 for said selected block representing a difference between the signal values in said selected block and an average of all of said signal values in said selected block;

means for finding an entry in said class-1 table that is a best match for said vector Xbar1, referred to as a class-1 best match entry;

means for finding an entry in said class-2 table that is a best match for said vector Xbar2, referred to as a class-2 best match entry;

means for selecting one of said best match entries by: (1) determining respective error values for each of said class-1 best match entry and said class-2 best match entry, and (2) selecting said class-2 best match entry if (i) the error value for said class-2 best match entry is less than the error value for said class-1 best match entry and (ii) said respective error values differ by more than a specified difference, else selecting said class-1 best match entry;

means for determining said respective error values by computing a least-squares distance between, respectively, (1) said class-1 best match entry and said vector Xbar1, and (2) said class-2 best match entry and said vector Xbar2; and means for determining if both of said respective error values exceed a specified quality index, referred to as K, then inserting into said compressed signal stream a lossless compressed signal segment that represents all of the signal values of said selected block, else inserting into said compressed signal stream an identifying code of said selected best match entry;

means for transmitting said compressed signal stream to a decoder; and at said decoder, means for decompressing said compressed signal stream into a decompressed graphic-image signal.

19. An improved VQ system for compressing a signal to produce a compressed signal stream, said system comprising:

means for providing first and second tables of vector entries having different degrees of signal correlation, referred to as a class-1 table and a class-2 table respectively;

means for dividing said digital signal into a series of segments, each segment comprising a plurality of digital signal values, each said segment having a quality index, referred to as K;

means for designating one or more of said segments as having a K of zero;

means for determining a vector Xbar1 for a selected segment representing a first degree of signal correlation for the signal values in said selected segment;

means for determining a vector Xbar2 for said selected segment representing a second degree of signal correlation for the signal values in said selected segment;

means for finding an entry in said class-1 table that is a best match for said vector Xbar1, referred to as a class-1 best match entry;

means for finding an entry in said class-2 table that is a best match for said vector Xbar2, referred to as a class-2 best match entry;

means for selecting one of said best match entries by: (1) determining respective error values for each of said class-1 best match entry and said class-2 best match entry, and (2) selecting said class-2 best match entry if (i) the error value for said class-2 best match entry is less than the error value for said class-1 best match entry and (ii) said respective error values differ by more than a specified difference, else selecting said class-1 best match entry;

means for determining if both of said respective error values exceed the K for said selected segment, then inserting into said compressed signal stream a lossless compressed signal segment that represents all of the signal values of said selected segment, else inserting into said compressed signal stream an address of said selected one of said best match entries.

* * * * *